Patented Mar. 1, 1927.

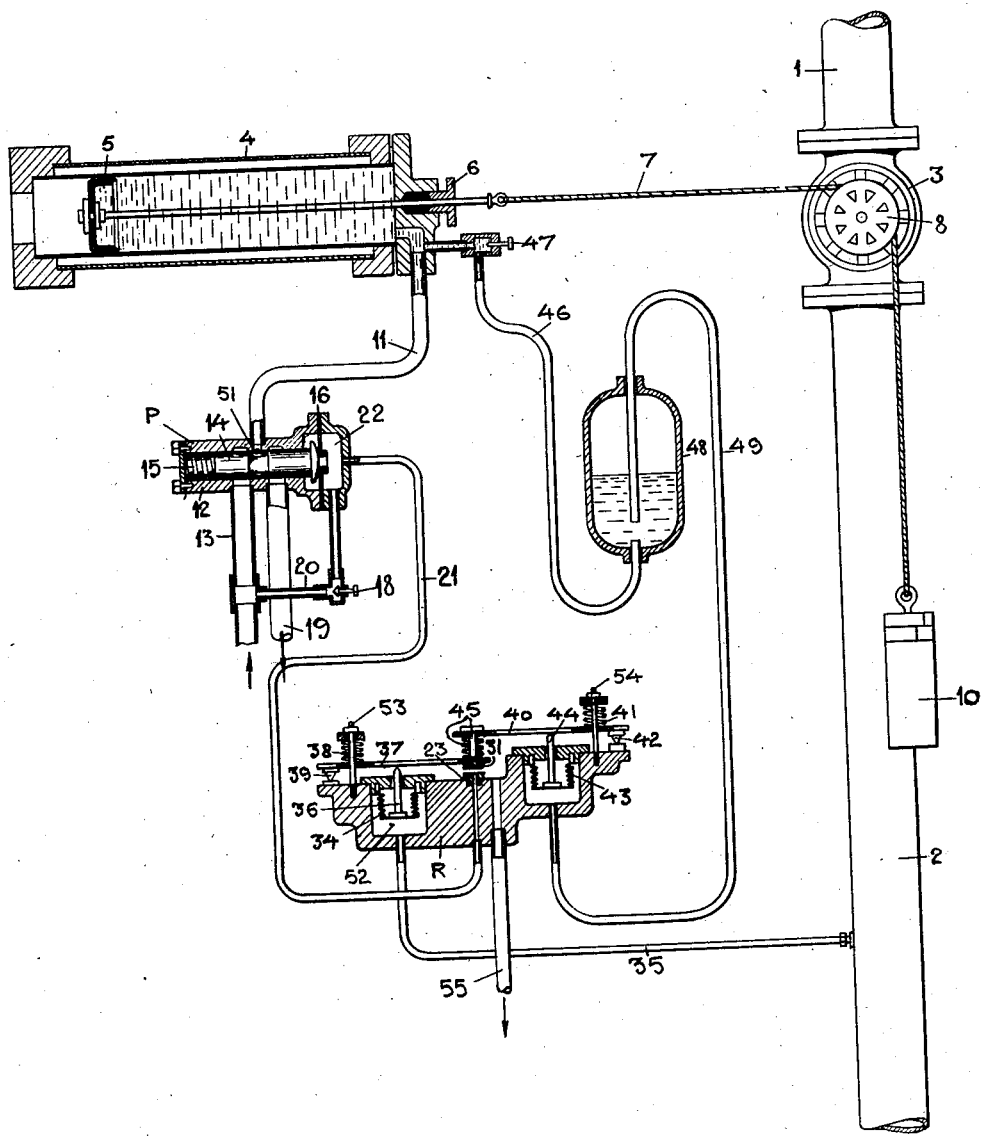

1,619,351

UNITED STATES PATENT OFFICE.

THOMAS LINDSAY, OF LONDON, ENGLAND, ASSIGNOR TO ARCA REGULATORS, INC., OF NEW YORK, N. Y., A CORPORATION OF VIRGINIA.

FLUID-PRESSURE-OPERATED REGULATOR.

Application filed February 12, 1925, Serial No. 8,741, and in Great Britain February 28, 1924.

This invention relates to regulators for general use such as controlling a current of liquid, steam, gas, an electric current, the speed of machinery, humidity, temperature and generally variations in physical conditions in working processes. Although it can be used with any desired means, the device is particularly adapted to be used with a servomotor operating a main regulating device in connection with a regulator of the type in which variations of the pressure of a liquid or other fluid continuously passing through a discharge aperture are utilized for causing the impulse to actuate the regulating member.

In the known devices of this kind the pressure of the liquid or other fluid which continually passes as a jet through a discharge aperture is controlled by the position of a baffling or throttling member, which is adapted to move in frictionless manner towards or away from said discharge aperture. The position itself of said baffling member is controlled by the regular working of the apparatus or process to be controlled, for instance, the pressure of steam or gas supplied through the main regulating member. The variation in pressure thus produced in the pressure fluid preferably causes a diaphragm-operated pilot valve to open or close, thereby increasing or decreasing the pressure in the pressure fluid passing to the servomotor, the servomotor actuating the main regulating member by means of a pulley actuated by a counterweight or similar motion transmitting means.

It has been found that although regulators of this construction are very accurate and reliable, there are cases where the operation of the apparatus is not satisfactory, as the time factor has not been taken into account. One of the fundamental conditions of a regulator in such cases as the control of the exhaust from the intermediate pressure cylinder of an engine or from a bleeder type turbine, is that the control must be instantaneous, because the centrifugal regulator of such motors only affects the controlling result after a certain lapse of time. Thus it may happen that within this interval the device over- or underregulates the machine or process.

The present invention aims at overcoming these disadvantages by providing compensation impulses for checking the action of the servomotor, and thereby controlling the main regulating device in accordance with the actual control required.

For providing said compensating impulses according to the invention, use is made of the variations in pressure prevailing in the pressure fluid of the servomotor.

In order to understand the invention more clearly, reference is made to the accompanying drawing which shows, by way of example, the improvements in the controlling device of the present invention with reference to the control of a main valve of a steam pipe.

Referring to said drawing:—

1 is the inlet end of the steam pipe, 2 the controlled side, 3 the main steam valve to be controlled. The position of said valve 3 depends on the position of piston 5, moveable in cylinder 4 of servomotor S, the rod 6 of the piston being connected with the rope 7 or the like, running over a pulley 8, connected with the valve disc or the like of valve 3. At its right hand side the piston 5 is actuated by the pressure of pressure liquid in the cylinder 4, which pressure tends to move the piston to the left, but which is balanced by suitable means acting on the rope 7, for instance a counterweight 10. One end of a pipe 11 opens into the righthand end of the cylinder 4, the other end of said pipe being connected with the pilot valve device P. This valve device consists of a slide valve housing 12 into the interior of which a pipe 13 leads, through which pressure liquid is supplied to the valve device. The supply of liquid into the interior of housing 12 and thence to the servomotor is controlled by means of slide valve 14 to which is rigidly connected a diaphragm 16 secured in the casing 12. A spring 15 acts against slide valve 14 at the end opposite to that to which diaphragm 16 is attached. Due to the formation of groove 51 of slide valve 14 communication may be established between pipe 13 and the pipe 11, leading to the cylinder 4, or between pipe 11 and a waste pipe 19 depending upon movement of the slide valve. The supply pipe 13 connects with a pipe 20 communicating with a chamber 22, positioned in the valve casing 12 to one side of the diaphragm 16. Pipe 20 is controlled by a needle-valve 18. A pipe 21 communicates at one end with the chamber 22, and at its other end with a discharge nozzle 23 in relay R. Communication is effected between the controlled end 2 of the steam pipe and bellows chamber 52 by means of a pipe 35, said bellows chamber being partly formed by an inverted bellows 34. Inside the bellows rests a pillar pin 36 abutting against a lever 37 to which baffling member 31 is attached, said lever 37 being held in position by a spring 38 and stud bolt 53 and being adapted to pivot around two pivot points 39, of which one can be seen in the sectional elevation. A second lever 40 is also arranged to move said baffling member 31, said lever being held in position by a spring 41 and stud bolt 54, and being adapted to pivot around two points 42, of which one can be seen in the sectional elevation. This second lever 40 is actuated by a liquid-operated bellows 43, provided with a pillar pin 44 abutting against the lever 40. The two levers 37 and 40 are connected by means of a flexible connection 45 attached to the baffling member 31 and comprising a stud bolt passing loosely through lever 40 and a spring acting between lever 37 and lever 40. Liquid spraying out through nozzle 23 against baffling member 31 may drain through conduit 55.

The pressure occurring in the cylinder 4 of the servomotor S actuating the main valve 3 is transmitted by liquid through conduit 46, controlled by needle valve 47 to the lower part of a closed air vessel 48, said air vessel communicating directly with the aforementioned bellows 43 by means of a conduit 49. The air vessel end of said conduit 49 reaches almost to the bottom of the air vessel 48. The construction of the air vessel 48 and the inlet and outlet conduits 46 and 49 is such that the pressure of the air vessel will always tend to equalize the pressure in the cylinder 4 of the servomotor, that is to say, when the piston 5 of the servomotor S is stationary the pressure in the air vessel 48 will always be the same as that within the cylinder 4.

The device operates in the following manner:

Pressure liquid continuously enters through the pipe 13, passes through the conduit 20, and exercises a pressure against the right-hand side of the diaphragm 16, in accordance with the position of baffling member 31 with relation to the discharge nozzle 23, which position is determined by the working of the process or apparatus, i. e. in the present case by the pressure of steam in the controlled pipe 2. In the position of the diaphragm shown, the valve 14 is in what may be termed a neutral position i. e. pipe 11 is neither connected with supply pipe 13 or waste pipe 19. The servomotor piston 5 is then stationary. Under this condition the pressure acting on bellows 43, which tends to lift baffling member 31 from the nozzle 23 is compensated by the pressure exerted by the spring 41 so that no influence on the baffling member 31 is exerted by the lever 40.

If the quantity and pressure of the steam in the controlled pipe 2 increases beyond the normal value required for the working of the process or apparatus, the bellows 34 will be compressed, and the pillar pin 36 will lift the lever 37 upwards, and raise the baffling member 31 from the jet opening 23. Consequently the checking action of the baffling member 31 on the free flow of the liquid from the nozzle 23 will be decreased, the pressure against the diaphragm 16 of the valve 14 of the pilot valve P will be lowered and the spring 15 will move the piston valve 14 to the right, thus causing liquid to flow from the cylinder 4 through the pipe 11 to the waste pipe 19, due, in part, to the action of the counter-weight 10. The pressure of the pressure liquid is thus somewhat decreased. The weight 10 will move the piston 5 to the right, and at the same time close the valve 3 slightly, until the corrected pressure is obtained.

In the hitherto used system of control of this kind, until this corrected pressure is obtained, there is a lapse of time, so that the regulator piston 5 will continue to move to the right, by reason of the pull of the counterweight 10 with the result that there will be over-regulation.

Now according to the invention, a compensating impulse is provided to prevent such over-regulation, which compensating impulse causes the movement of the piston 5 to be stopped before such over-regulation can take place, as will be explained hereinafter.

The needle-valve 47 controls the conduit 46. The opening of said needle-valve 47 can be regulated so as to vary the rate of increase or decrease of pressure in the air vessel 48, for the purpose of suiting the characteristics of the process or apparatus which is to be controlled, in such a way that the pressures on the bellows 43 will vary at the correct time.

Owing to the aforementioned outflow of the pressure liquid from the pipe 11 of the cylinder 4 of the servomotor S to the waste 19, the pressure in the air vessel 48 is also decreased in a degree depending on the opening of the needle-valve 47 whereby also the power of the pressure liquid acting against the bellows 43 is decreased, which consequently can no longer withstand the counteraction of the spring 41, said spring 41 then pressing against the lever 40 and consequently causing the baffling member 31 to approach the nozzle 23, to check the free flow of the liquid from the nozzle 23, and thereby counteracting the previous tendency of the increased pressure acting through the pipe 35 to press against the bellows 34 and raise the baffling member 31 from the nozzle 23. Thus the pressure of the pressure liquid acting against the diaphragm 16 will be increased and the valve 14 will be moved slightly to the left and decrease the outlet to the waste 19 and increase the pressure in the cylinder 4. The fluid pressure in the air vessel 48 being now lower than that in the cylinder 4 of the servomotor S, there will be a flow of pressure liquid from the cylinder 4 toward the air vessel 48, in accordance with the amount of opening of the needle-valve 47 and as soon as the fluid pressure in the air vessel 48 is equal to the pressure in the cylinder 4, when the piston is again at rest, the lever 40 will assume a neutral position with relation to the baffling member 31, that is to say, it will not exercise any force whatever on the baffling member 31, thus leaving the baffling member 31 to be influenced by the controlled reduced pressure existing now in the controlled main 2 caused by the closing of the valve 3.

Supposing now the pressure in the steam main 2 decreases below normal. Then the spring 38 will be stronger than the pressure exercised against the bellows 34 and the baffling member 31 approaches the nozzle 23, whereby the pressure against the right-hand side of the diaphragm 16 will be increased, the valve 14 shifting to the left and causing pressure liquid to be admitted through the pipe 11 to the cylinder 4, with the result that the piston 5 in the cylinder 4 of the servomotor S moves to the left, lifting the counterweight 10 and opening the valve 3, thus admitting more steam to the main pipe 2. The increased pressure in the cylinder 4 causes a rise of pressure in the air vessel 48 which pressure is transmitted to the bellows 43, the pillar pin 44 of which causes the lever 40 to lift upwards and tends to lift the baffling member 31 away from the nozzle 23, thus compensating the depressing action previously exercised on the baffling member 31 by the lever 37 and causing the piston 5 to come to rest. As the pressure in the air vessel 48 is now higher than that in the servomotor S, there will be a flow of liquid from the air vessel 48 toward the cylinder 4 which flow is regulated by the needle-valve 47, and as soon as the liquid pressure in the air vessel 48 is equal to the pressure in the cylinder 4 when the piston is at rest, the lever 40 will assume a neutral position, in relation to the baffling member 31, that is to say it will exercise no force whatever on the baffling member 31, thus leaving the same to be influenced solely by the increased pressure caused in the controlled main 2 by the opening of the valve 3.

It is to be understood that the hereinbefore described construction or the operation of the device of the present invention is only given by way of example, and various modifications may be made without departing from the scope of the invention.

Having thus described my invention what I claim and desire to secure by U. S. Letters Patent is:

1. Apparatus for automatic control comprising a main control member, a liquid pressure operated servomotor to control said main control member, a relay to control said servomotor, said relay comprising a moveable baffling member, means to discharge a stream of liquid against said baffling member, and means to move said baffling member in response to changes in that which is to be controlled and in response to changes of liquid pressure in said servomotor.

2. Apparatus for automatic control comprising a main control member, a servomotor to control said main control member, a liquid space in said servomotor, a relay to control said servomotor, said relay comprising a moveable baffling member, means to discharge a stream of liquid against said baffling member, actuating means for said baffling member moveable in response to changes in that which is to be controlled, a second actuating means for said baffling member and a communication between said liquid space of the servomotor and said second actuating means.

3. Apparatus for automatic control comprising a main control member, a servomotor to control said main control member, a liquid space in said servomotor, a relay to control said servomotor, said relay comprising a moveable baffling member, means to discharge a stream of liquid against said baffling member, actuating means for said baffling member moveable in response to changes in that which is to be controlled, a second actuating means for said baffling member, a communication between said liquid space of the servomotor and said second actuating means and an air vessel forming a part of said communication.

4. Apparatus for automatic control comprising a main control member, liquid pressure operated mechanism to control said main control member, a relay to control said mechanism, said relay comprising means to discharge a jet of liquid, a plurality of levers operating to control said jet of liquid, one of said levers being responsive to changes in that which is to be controlled and a second lever being responsive to changes of liquid pressure due to movement of said mechanism.

5. Apparatus for automatic control comprising a main control member, a servomotor to control said main control member, a liquid space in said servomotor, a relay, means to discharge a stream of liquid into said relay, means whereby changes of pressure in said stream of liquid cause movement of the servomotor, means to control said stream of liquid moveable in response to that which is to be controlled, compensating mechanism acting on the last named means and a liquid communication between said liquid space of said servomotor and said mechanism.

6. Apparatus for automatic control comprising a main control member, a servomotor to control said main control member, a liquid space in said servomotor, a relay, means to discharge a stream of liquid into said relay, means whereby changes of pressure in said stream of liquid cause movement of the servomotor, a baffling member to control said stream of liquid, actuating mechanism for said baffling member, an air vessel, a communication between said liquid space of said servomotor and said air vessel, a second communication between said air vessel and said actuating mechanism and means to move said baffling member in response to changes in that which is to be controlled.

7. Apparatus for automatic control comprising a main control member, a servomotor to control said main control member, a liquid space in said servomotor, a relay, means to discharge a stream of liquid into said relay, means whereby changes of pressure in said stream of liquid cause movement of the servomotor, a baffling member to control said stream of liquid, actuating mechanism for said baffling member, an air vessel, a communication between said liquid space of said servomotor and said air vessel, a second communication between the lower part of said air vessel and said actuating mechanism and means to move said baffling member in response to changes in that which is to be controlled.

8. Apparatus for automatic control comprising a main control member, a servomotor to control said main control member, a pilot valve to control said servomotor, a relay to control said pilot valve, liquid communication between said servomotor and said pilot valve and between said pilot valve and said relay, means to discharge a jet of liquid into said relay through the last mentioned communication, a baffling member to control said jet, means to move said baffling member in response to changes in that which is to be controlled, compensating mechanism acting on said baffling member and a liquid communication between said servomotor and said compensating mechanism.

9. Apparatus for automatic control comprising a main control member, a servomotor to control said main control member, a pilot valve to control said servomotor, a relay to control said pilot valve, liquid communication between said servomotor and said pilot valve and between said pilot valve and said relay, means to discharge a jet of liquid into said relay through the last mentioned communication, a plurality of levers operating to control said jet, one lever being responsive to changes in that which is to be controlled and the second lever being actuated by changes of pressure in said servomotor.

10. In a relay for liquid pressure operated regulators of the type wherein a continuously flowing stream of liquid is checked by a lever, the combination with said lever, of a second lever moveable in response to changes of liquid pressure in the course of regulation and operating to compensate for changes in regulating effect produced by the first lever.

11. In a relay for liquid pressure operated regulators of the type wherein a continuously flowing stream of liquid is checked by a lever, the combination with said lever, of a second lever acting upon the first lever and moveable in response to changes of liquid pressure in the course of regulation.

12. In a relay for liquid pressure operated regulators of the type wherein a continuously flowing stream of liquid is checked by a lever, the combination with said lever, of a second lever acting upon the first lever and moveable in response to changes of liquid pressure in the course of regulation and a resilient connection between the two levers.

13. Apparatus for automatic control comprising a main control member, liquid pressure means to control said main control member, a relay, means to discharge a stream of liquid into said relay, means whereby said stream of liquid controls said liquid pressure means, a baffling member to control said stream of liquid, mechanism to move said baffling member, a liquid communication between said liquid pressure means and said mechanism and means to move said baffling member in response to changes in that which is to be controlled.

14. Apparatus for automatic control comprising a main control member, liquid pressure means to control said main control member, a relay, means to discharge a stream of liquid into said relay, means whereby said stream of liquid controls said liquid pressure means, a lever to control said stream of liquid in response to changes in that which is to be controlled, a second lever to control said stream of liquid, actuating mechanism for said second lever and a liquid communication between said liquid pressure means and said actuating mechanism.

15. Apparatus for automatic control comprising a main control member, a liquid pressure means to control said main control member, a relay, means to discharge a stream of liquid into said relay, means whereby said stream of liquid controls said liquid pressure means, a lever to control said stream of liquid in response to changes in that which is to be controlled, a second lever to control said stream of liquid, actuating mechanism for said second lever. a liquid communication between said liquid pressure means and said actuating means and an air vessel associated with said liquid communication.

16. Method of automatic control which comprises controlling the pressure of a first stream of liquid in response to changes in that which is to be controlled, controlling the flow of a second stream of liquid by changes of pressure in the first stream, regulating that which is to be controlled by changes of pressure in said second stream of liquid and causing the second stream of liquid to produce a compensating effect on the first stream of liquid.

17. Method of automatic control which comprises decreasing the outflow of a jet of liquid in response to a given change in that which is to be controlled, causing the decreased outflow to give a rise in pressure in a first stream of liquid, altering flow of a second stream of liquid by said rise of pressure, regulating that which is to be controlled by change of flow in said second stream of liquid and causing the flow of the second stream of liquid to increase the outflow of said jet.

18. Apparatus for automatic control comprising a main control member, liquid pressure operated mechanism to control said main control member, a relay to control said mechanism, said relay comprising a movable baffling member, means to discharge a stream of liquid against said baffling member, and means to move said baffling member in response to changes in that which is to be controlled and in response to changes of liquid pressure caused by movement of said mechanism.

19. In a relay for liquid pressure operated regulators of the type wherein a continuously flowing stream of liquid is checked by a baffling member, the combination with said member, of liquid pressure operated compensating mechanism movable in response to changes of liquid pressure in the course of regulation and operating to compensate for changes in regulating effect produced by said baffling member.

20. Apparatus for automatic control comprising a main control member, a relay to control said main control member, said relay comprising a movable lever, means to discharge a stream of fluid against said lever, means to control the position of said lever in response to a controlling impulse, a member movable in response to a compensating impulse affected by movement of said lever in response to the first mentioned impulse and a resilient interconnection between said member and said lever.

21. In a relay for fluid pressure operated regulators of the type wherein a continuously flowing stream of fluid is checked by a lever, the combination with said lever, of a second lever movable in response to changes in a compensating force adapted to be affected by movement of the first mentioned lever and a resilient interconnection between said levers.

In testimony whereof I affix my signature.

THOMAS LINDSAY.